(No Model.)
J. CROPPER.
WATER CLOSET BOWL.
No. 270,754. Patented Jan. 16, 1883.
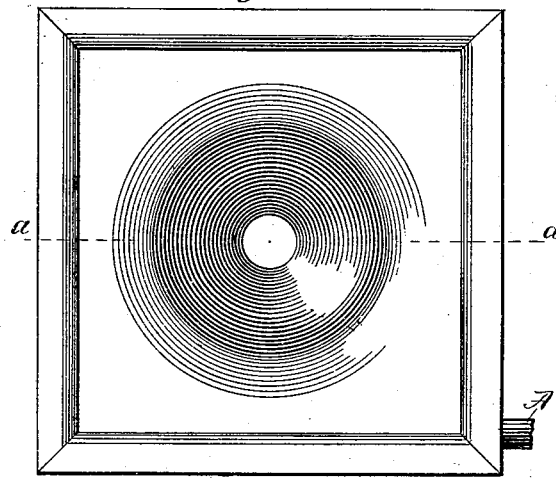
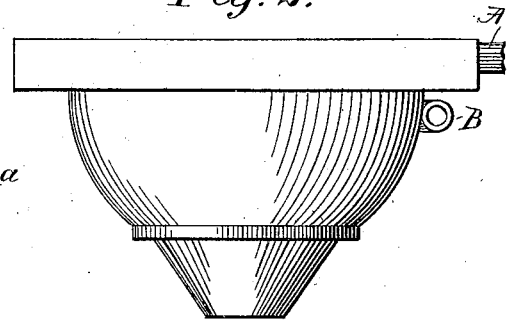
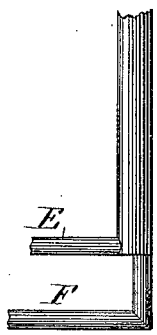
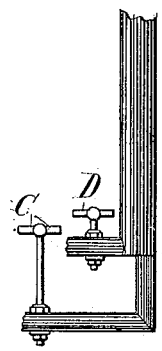
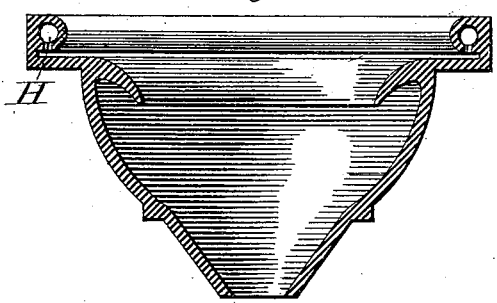
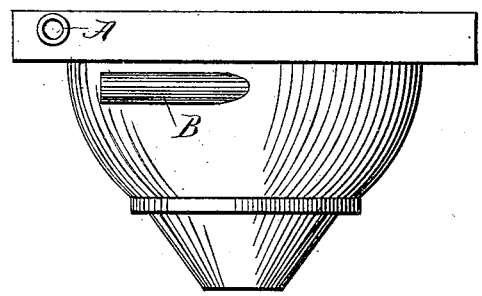
Witnesses.
Inventor
John Cropper

UNITED STATES PATENT OFFICE.

JOHN CROPPER, OF NEW YORK, N. Y.

WATER-CLOSET BOWL.

SPECIFICATION forming part of Letters Patent No. 270,754, dated January 16, 1883.

Application filed June 29, 1882. (No model.)

*To all whom it may concern:*

Be it known that I, JOHN CROPPER, of the city, county, and State of New York, have invented a certain Improvement in Water-Closet Bowls, of which the following is a specification, with drawings attached.

To carry out my invention as defined by the claim at the end of this specification, I construct an ordinary round water-closet bowl with an upper flange spreading into an oval, round, or square shape to conform to the wood-work of its setting, the square being preferable, and having around the exterior outer edge of said flange a pipe-like recess, in the under side of which are small openings or holes, of either square, round, or oval shape, opening down toward the said flange, the bowl, flange, and its pipe-like edge to be made of the same material, preferably porcelain or earthenware, and all in one piece, and of sufficient thickness to be durable, the bowl to be washed in the ordinary way by a pipe from a cistern, the stream passing in from the front by an arm made as a tangent to the circumference of the bowl, but the upper flange or tray to be washed at the same time by an arm from the cistern-pipe, which enters the pipe-like edge of the flange, and, escaping by the downward holes, flows gently over the surface of the flange and runs down into the bowl, the bowl and flange by this means being washed at one and the same time and kept constantly pure and sweet, and free from the drippings or slops which may have fallen or been poured thereon. The pipe to supply both bowl and flange is made with an arm to run into the edge of the flange, and should be twice as large above said arm as below it; or should be of uniform size and supplied by stop-cocks—one in the arm and one below it—so arranged as to be worked above the wood-work of the seat, and thus the force of the streams can be regulated by those using the bowl at their pleasure, all which will more clearly and fully appear by reference to the figures of the drawings, as follows:

Figure 1 is a top view of the bowl. Fig. 2 is a front view of the bowl, showing the two openings for the pipes A and B. Figs. 3 and 4 show the cistern-pipe with and without the stop-cocks. Fig. 5 shows a transverse section of the bowl along the line $a\ a$ in Fig. 1. Fig. 6 is a side view of the bowl, showing the two openings for the pipes A and B.

Looking at Fig. 1, we have the top view of bowl with a square flange or tray, showing the position of round bowl, with its center on a line a little farther back than the line drawn through the middle points of each side.

Looking at Figs. 2, 3, and 5, we have side views of bowl, showing openings for pipe A and B, and the cistern-pipe, with its arm E and its lower branch, F. The water, when allowed to escape from cistern, flows down the pipe until it comes to the arm E, where the pipe is reduced to half its size, thus forcing half the water through the arm E and allowing the other half of the water to escape by the lower part of the pipe F. The water from the arm E passes into the pipe-like edge of the flange at A, and, passing through said pipe-like edge, runs round, escaping through the small holes H H, in Fig. 5, and, flowing over the flange, runs into the bowl. At the same time the other half of the water from the cistern-pipe rushes into the bowl by the lower part of the pipe through the opening B, thus washing the flange and bowl at the same time. By using a pipe with stop-cocks D and C in Fig. 4 the same results are obtained, and the supply of water can be regulated by the person using the bowl. The seat to be used is the ordinary wooden seat.

What I claim as my invention is—

The combination, substantially as herein set forth, of the water-closet bowl provided with a tray, the inclosing-flange, and the perforated flushing-pipe, with the tray-flushing inlet-pipe, and the bowl-flushing inlet-pipe to wash the tray and flush the bowl simultaneously.

New York, 26th May, 1882.

JOHN CROPPER.

Witnesses:
F. M. CHEESMAN, Jr.,
HARRY SPENCER.